Nov. 2, 1948.    L. FRANKEL    2,452,646
LAMP HOUSING FOR FILM PROJECTORS
Filed May 29, 1944    2 Sheets-Sheet 1
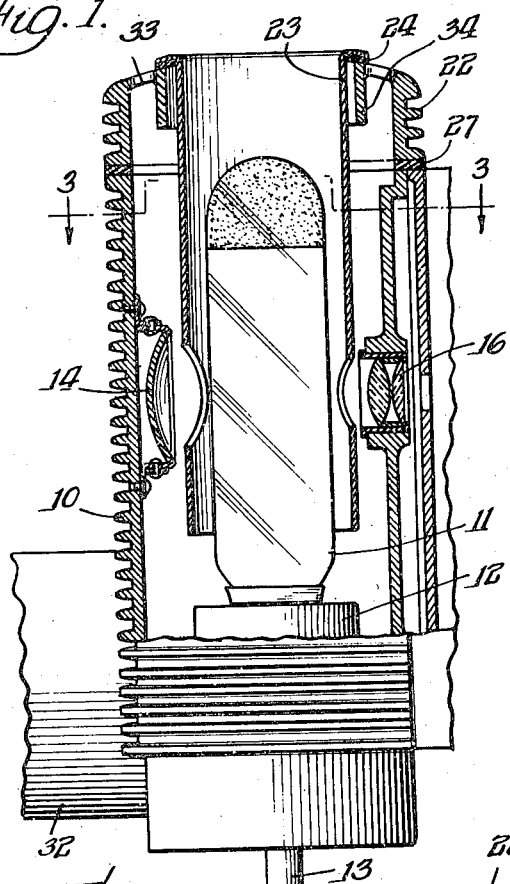
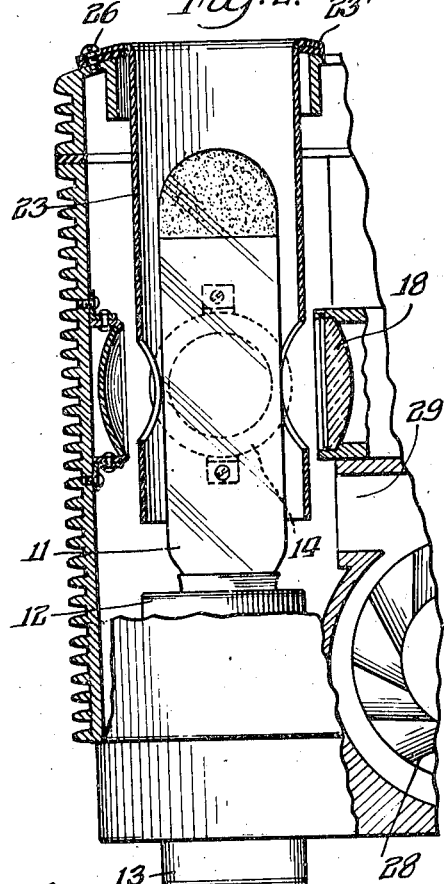
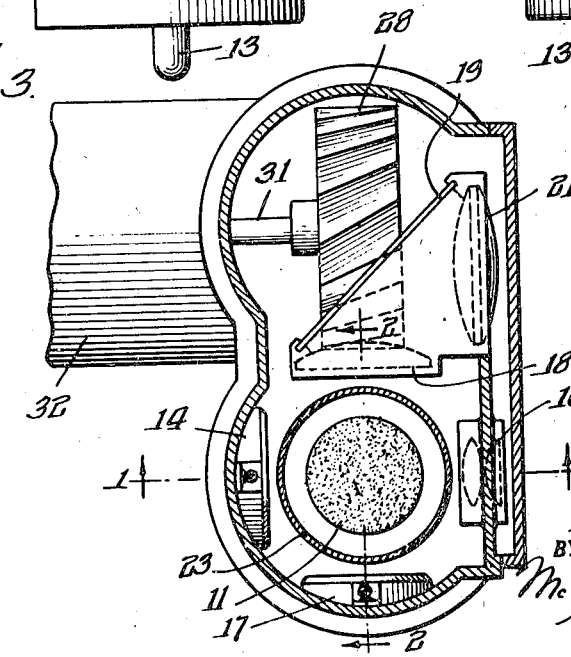
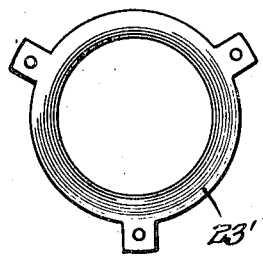
INVENTOR.
Leo Frankel
BY
McLaughlin & Wallenstein
attys.

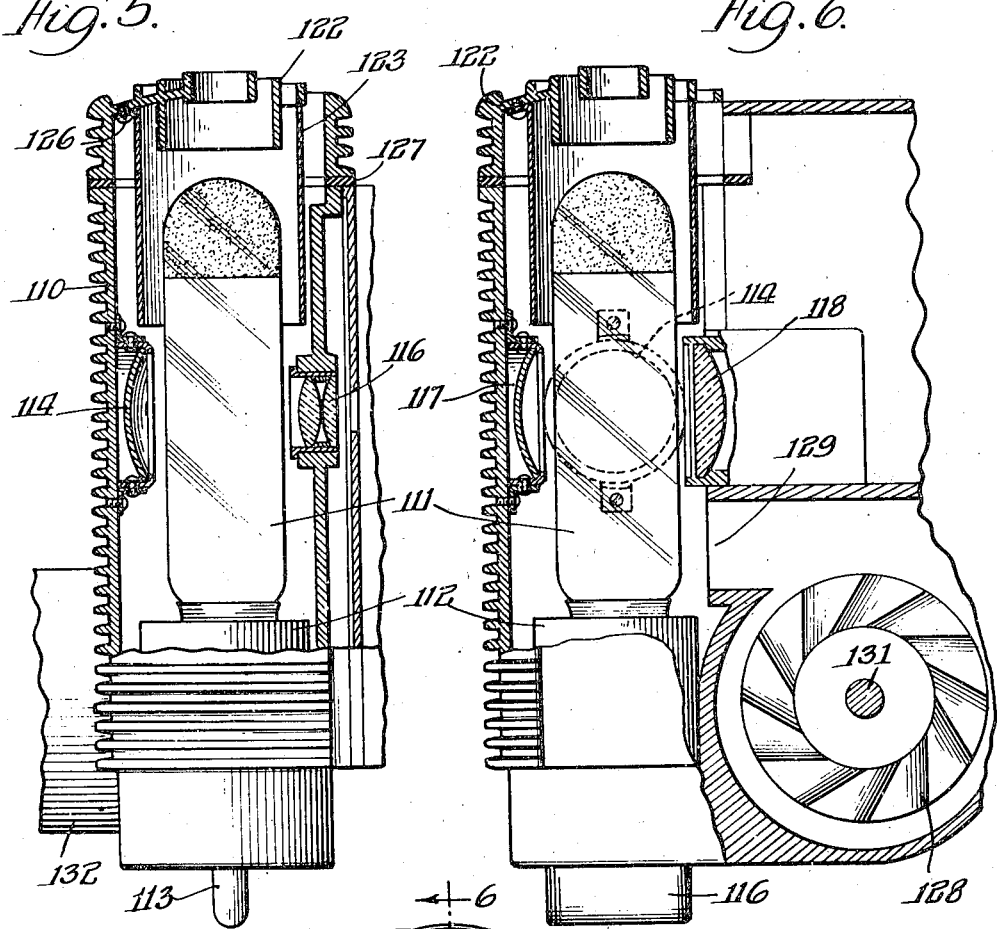

Patented Nov. 2, 1948

2,452,646

UNITED STATES PATENT OFFICE 2,452,646

LAMP HOUSING FOR FILM PROJECTORS

Leo Frankel, Chicago, Ill.

Application May 29, 1944, Serial No. 537,782

5 Claims. (Cl. 88—24)

My invention relates to motion picture projectors and more in particular to a method of and means for dissipating the heat developed by the usual projection lamp.

The present invention is a continuation-in-part of my prior application Serial No. 343,487, filed July 1, 1940, and which has become Patent No. 2,354,679, dated August 1, 1944. Such copending application discloses a multiple projector for projecting films of different sizes such as 8 mm. films and 16 mm. films, and, while the present invention is particularly adapted for use with projectors of the type disclosed in my copending application, the invention nevertheless may have utility generally in any type of projector in which there is a problem of properly controlling and dissipating the heat generated by a projection lamp.

My invention will be explained by reference to the accompanying drawings wherein—

Fig. 1 is an elevational view partly in section showing a lamp housing portion of a projector with the lamp and other apparatus associated therewith, the portion of the view shown in section being substantially along the section line 1—1 of Fig. 3;

Fig. 2 is a fragmentary vertical sectional view partly in elevation substantially at right angles to the section of Fig. 1, the section being taken along the line 2—2 of Fig. 3 looking in the direction of the arrows;

Fig. 3 is a plan sectional view taken on the line 3—3 of Fig. 1, looking in the direction of the arrows;

Fig. 4 is a plan view of a lamp shell forming a part of the invention;

Fig. 5 is a view similar to Fig. 1 but showing a modified arrangement, the view being taken along the line 5—5 of Fig. 7, looking in the direction of the arrows;

Fig. 6 is a vertical sectional view taken along the line 6—6 of Fig. 7, looking in the direction of the arrows; and Fig. 7 is a fragmentary plan view of the embodiment shown in Figs. 5 and 6.

I shall first describe the embodiment shown in Figs. 1 to 4, inclusive, and in connection therewith I wish to point out that only so much of a projector has been illustrated as appears to be essential to a full understanding of the invention herein disclosed and claimed. Those skilled in the art are referred to my copending application, above identified, for a further discussion of details of a projector of the type herein shown, such as arrangement of projection lenses, film transporting mechanism and the like.

The portion of the apparatus shown in the drawings comprises a lamp housing 10 in which a lamp 11 is supported on a base 12, the base 12 being rotated by suitable means such as a downwardly projecting handle 13. A reflector 14 is adapted to reflect light from the lamp 11 to condenser lenses 16 for delivery through a film and projection lenses (not shown). A second reflector 17 is adapted to assist in concentrating light from the lamp 11 to a condensing lens 18 from which such light is adapted to be delivered to a mirror 19 and thence to condenser lenses 21 for projecting film of a different size than the light system including condenser lenses 16.

The lamp housing 10 is provided with a housing cap 22 and both the housing 10 and cap 22 are provided with cooling fins of suitable type. Depending from the cap 22 is a tubular casing 23 which forms a baffle between the lamp 11 and the lamp housing 10. A gasket 24 of low heat conductivity is disposed between the lower surface of a flange 23' and the upper surface of the housing cap 22 and screws 26 extend through extensions of the flange 23' and into the housing cap 22 to mount the casing 23 firmly in position. A heat resisting gasket 27 is provided between the housing cap 22 and the lamp housing 10. The housing cap 22 is suitably fastened to the lamp housing 10 by conventional means (not shown).

A fan 28 is adapted to draw exterior air into the fan housing and to deliver such air through air duct 29 into the lamp housing at a point beneath the lower edge of casing 23. The fan 28 is driven by shaft 31 connected to a motor (not shown) disposed in motor housing 32. Air delivered to the lamp housing 10 escapes through the upper portion of such lamp housing. It will be noted that the entire upper portion of the casing 23 is open to permit free escape of air therefrom and it will be noted, also, that passageways 33 in the upper portion of the housing cap 22 between the exterior thereof and a depending skirt 34 permit the escape of some air around the outside of the casing 23. The casing 23 is apertured in the manner indicated in the drawings to permit light from the lamp 11 to reach the reflectors and also to reach the condenser lens. The casing 23, however, extends substantially to the bottom of the lamp 11.

The projection lamp 11 is of a type furnishing illumination of high intensity and, therefore, generating a substantial amount of heat which must be dissipated to avoid having the parts of the projection apparatus reach too high a temperature and/or possibly injuring the film, particularly if the latter should be stopped to show a single picture during a projection sequence. The fan provides means for passing a stream of air through the housing at a relatively high rate of speed. The casing 23, which is preferably formed of heat conducting material, causes a substantial amount of the air to pass upwardly between the casing 23 and the lamp 11. The casing becomes quite hot because it is interposed between the lamp and lamp housing; while the lamp housing itself remains relatively cool because there is not a direct flow of heat waves to the lamp housing such as would occur if the shell 23 were not employed; and the passage of air along both sides of the casing keeps the casing cool enough so that it does not become a secondary heat generator of sufficient intensity to appreciably raise the temperature of the lamp housing. The housing cap 22 is relatively warmer than the lamp housing 10 because it supports the casing 23, but it is not as hot as the casing 23 because of the interposition of low heat conductivity gasket 24. The gasket 27 limits heat flow from the relatively warmer cap 22 to the relatively cooler lamp housing 10.

The lamp 11 is also kept adequately cool by the constant movement of air across its exterior surface, but the cooling is accomplished in such a way as not to interfere with the light efficiency of the projection lamp. Those skilled in the art will understand that the lamp 11 may be of various types used in the motion picture industry, a common type being one in which a large proportion of the total light emitted from the lamp is concentrated in a single direction. In this type of lamp the top is usually darkened so that leaving the upper portion of the casing 23 entirely open will not result in the passage of an appreciable amount of light axially of such casing.

In the form of the invention shown in Figs. 5 to 7, inclusive, the same general features are employed as shown in the first described embodiment but the air controlling casing is more nearly structurally identical with the casing shown in my copending application above identified, of which this is a continuation-in-part. For convenience, and to simplify the description, I have employed the same reference characters in Figs. 5 to 7, inclusive, as employed in Figs. 1 to 4, inclusive, with, however, the numeral 1 as a prefix to indicate modification. It will be noted that the casing 123 extends down only to a point immediately above the condenser lenses and reflectors. This construction permits the use of either stationary reflectors or of a reflector associated with the lamp base and rotatable with the lamp and base in the general manner disclosed in my copending application. In this form of the invention there is relatively slight metal to metal contact between the casing 123 and the housing cap 122. The housing cap, nevertheless, will get relatively warmer than when employing the construction of the first described embodiment but the gasket 127 of low heat conductivity material prevents the flow of heat back from the housing cap 122 to the lamp housing 110.

I have described my invention by reference to structural details of two specific embodiments. It is understood that the scope of the invention is defined in the claims.

What I claim as new and desire to protect by Letters Patent of the United States is:

1. In a projector, a lamp housing including an apertured housing cap, low heat conductivity material between said housing and cap, a lamp disposed vertically in the housing, a casing suspended from the cap and surrounding the lamp, and means for forcing air through said housing and out through said cap, a portion of such air passing between the lamp and such casing.

2. In a projector, a lamp housing including an apertured housing cap, low heat conductivity material between said housing and cap, a lamp disposed vertically in the housing, a casing suspended from the cap and surrounding the lamp, and means for forcing air through said housing and out through said cap, a portion of such air passing between the lamp and such casing, said casing extending down almost to the bottom of such lamp, and being apertured to permit light delivery from the lamp to a point outside said casing.

3. In a projector, a lamp housing including an apertured housing cap, low heat conductivity material between said housing and cap, a lamp disposed vertically in the housing, a casing suspended from the cap and surrounding the lamp, low conductivity material between the casing and housing cap, and means for forcing air through said housing and out through said cap, a portion of such air passing between the lamp and such casing, said casing extending down almost to the bottom of such lamp, and being apertured to permit light delivery from the lamp to a point outside said casing.

4. In a projector, a lamp housing including a cap having a large center aperture, a lamp disposed vertically in the housing, a generally tubular casing surrounding the lamp and supported in said center cap aperture, said casing having an outflaring flange disposed above said cap, a gasket having low heat conductivity disposed between said flange and cap, and means for forcing air through said housing and between said casing and lamp.

5. In a projector, a lamp housing including an apertured housing cap, a lamp disposed vertically in the housing, a casing disposed in the housing and surrounding the lamp, support means on said housing cap for said casing thermally insulating said casing from said housing, and means for forcing air through said housing and out through said cap, a portion of such air passing between the lamp and such casing, said casing extending down from said housing cap almost to the bottom of such lamp, and being apertured to permit light delivery from the lamp to a point outside said casing.

LEO FRANKEL.

REFERENCES CITED

The following references are of record in the file of this patent:

UNITED STATES PATENTS

| Number | Name | Date |
| --- | --- | --- |
| 1,656,389 | Nothstine | Jan. 17, 1928 |
| 1,919,595 | Owens | July 25, 1933 |
| 1,921,214 | Carpenter | Aug. 8, 1933 |
| 1,937,585 | Luxmore | Dec. 5, 1933 |
| 1,966,531 | Tint | July 17, 1934 |
| 2,033,038 | Lee | Mar. 3, 1936 |
| 2,165,681 | Stechbart | July 11, 1939 |
| 2,269,794 | Stechbart | Jan. 13, 1942 |
| 2,279,930 | Howell | Apr. 14, 1942 |
| 2,294,219 | Woermann | Aug. 25, 1942 |
| 2,312,561 | Leonard | Mar. 2, 1943 |